(12) United States Patent
De et al.

(10) Patent No.: US 11,550,979 B2
(45) Date of Patent: Jan. 10, 2023

(54) IMPLEMENTING AND VERIFYING SAFETY MEASURES IN A SYSTEM DESIGN BASED ON SAFETY SPECIFICATION GENERATED FROM SAFETY REQUIREMENTS

(71) Applicant: Synopsys, Inc., Mountain View, CA (US)

(72) Inventors: Kaushik De, Pleasanton, CA (US); Meirav Nitzan, Mountain View, CA (US); Stewart Williams, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/235,802

(22) Filed: Apr. 20, 2021

(65) Prior Publication Data

US 2021/0334443 A1    Oct. 28, 2021

Related U.S. Application Data

(60) Provisional application No. 63/014,857, filed on Apr. 24, 2020.

(51) Int. Cl.
*G06F 30/327* (2020.01)
*G06F 30/3323* (2020.01)
*G06F 30/31* (2020.01)
*G06F 119/02* (2020.01)

(52) U.S. Cl.
CPC ............ *G06F 30/327* (2020.01); *G06F 30/31* (2020.01); *G06F 30/3323* (2020.01); *G06F 2119/02* (2020.01)

(58) Field of Classification Search
CPC ...................................................... G06F 30/327
USPC ........................................................ 716/104
See application file for complete search history.

(56) References Cited

U.S. PATENT DOCUMENTS

| 8,065,644 B1 * | 11/2011 | Jacobson | G11C 5/005 |
| | | | 716/112 |
| 10,643,011 B1 * | 5/2020 | Nardi | G06F 30/394 |
| 2019/0228125 A1 * | 7/2019 | Pillay | G06F 30/327 |

OTHER PUBLICATIONS

Benites, L. A. C. "Automated Design Flow for Applying Triple Modular Redundancy in Complex Semi-Custom Digital Integrated Circuits." Master Thesis, Universidade Federal Do Rio Grande Do Sul, Jul. 31, 2018, pp. 1-139.

(Continued)

*Primary Examiner* — Eric D Lee
(74) *Attorney, Agent, or Firm* — Fenwick & West LLP

(57) ABSTRACT

A system enhances a system design to incorporate safety measures. The system receives a system design for processing through various stages of design using design tools, for example electronic design automation tools for introducing safety features in a circuit design. The system receives safety requirements for the system design, the safety requirements specifying safety measures for the system design. The system generates from the safety requirements, a safety specification storing a set of commands. The system generates a system design enhanced with safety measures. The enhanced system design it generated for at least a subset of the plurality of tools. A tool processes the generated safety specification to implement safety measures in the system design according to the received safety requirements.

20 Claims, 10 Drawing Sheets

(56) References Cited

OTHER PUBLICATIONS

Entrena, L. et al. "Automatic Insertion of Fault-Intolerant Structures at the RT Level." Proceedings of the Seventh International On-Line Testing Workshop, Jul. 9-11, 2001, pp. 48-50.
PCT International Search Report and Written Opinion, PCT Application No. PCT/US2021/028239, dated Aug. 26, 2021, 15 pages.

* cited by examiner

IMPLEMENTING AND VERIFYING SAFETY MEASURES IN A SYSTEM DESIGN BASED ON SAFETY SPECIFICATION GENERATED FROM SAFETY REQUIREMENTS

CROSS REFERENCE TO RELATED APPLICATIONS

This application claims a benefit of U.S. Patent Application Ser. No. 63/014,857, filed Apr. 24, 2020, the contents of which are incorporated by reference herein.

FIELD

The present disclosure relates generally to a design automation system and more specifically, to implementation of safety measures such as safety mechanisms in systems such as electronic circuits based on a safety specification generated from safety requirements.

BACKGROUND

In a design flow for a system, a user analyzes possible failures, for example, safety hazards, and mitigates them through safety measures added to the design. Examples of such design flow include automotive design flow. The safety measures are noted and tracked in safety requirement management tools. This process requires the user to manually add the safety measures to the design and ensure that they are implemented and verified properly through the design cycle. Typically, in a design cycles, several design tools may be used. For example, in the design cycle of a circuit, several electronic design automation tools may be used including verification tools, synthesis and place and route tools, fault simulators, and so on. Implementing the safety measures consistently across such wide variety of tools is a tedious and error-prone process. If safety measures are not implemented properly, or missed altogether, the resulting loss of diagnostic coverage may be identified much later in the design cycle or may be missed completely. This results in significant waste of effort since several design processes may have to be repeated with a corrected design. Alternatively, if the inconsistency in implementation of safety measures is missed entirely, the resulting product may have a faulty design.

SUMMARY

The above and other issues are addressed by a computer-implemented method, computer system, and computer program product for instructions for enhancing a system design to incorporate safety measures. A system design is received for processing through various stages of design cycles using design tools. For example, the system design may represent a circuit design that is processed through several EDA tools. The system receives safety requirements for the system design. The safety requirements specify safety measures for the system design. Examples of safety measures include safety register with one of: triple mode redundancy, double mode redundancy, or fault tolerance, dual core lock step, failsafe finite state machine, or monitors. The system generates a safety specification including a set of commands from the safety requirements. A command specifies (a) a safety measure for one or more components of the system design and (b) one or more attributes processed by one or more tools for implementing and verifying the safety measure. The system generates a system design enhanced with safety measures based on the safety specification. The enhanced system design is generated for at least a subset of the plurality of tools. Each tool from the subset processes the generated safety specification to implement and verify safety measures in the system design according to the received safety requirements.

A safety measure is implemented in a component of the system design. The component may be a software component, a hardware component, or a firmware component.

In an embodiment, a tool from the subset is a synthesis tool and processing the generated safety specification by the synthesis tool includes, selecting a command that specifies a safety measure and modifying a representation of the circuit design processed by the synthesis tool to implement the safety measure specified by the command.

In an embodiment, a tool from the subset is a place and route tool for circuit designs and processing the generated safety specification by the synthesis tool includes, selecting a command from the safety specification specifying a safety measure and ensuring a physical separation between components by the place and route tool in accordance with the selected command.

In an embodiment, a tool from the subset is a formal verification tool, and the system verifies using the formal verification tool, that the safety measures implemented in the design conform to the received safety requirements.

In an embodiment, a tool from the subset is a fault simulator that performs diagnostic coverage of the circuit design enhanced with safety measures. The diagnostic coverage conforms to the generated safety specification.

In an embodiment, a tool from the subset that is enhanced with safety measures performs estimation of power, timing, congestion, area, and so on. The tool may be a simulation tool, verification plan tool, coverage management tool, and so on.

Although embodiments disclosed use hardware and circuits design as examples to illustrate the techniques, the disclosed techniques are applicable to software designs.

The features and advantages described in this summary and the following detailed description are not all-inclusive. Many additional features and advantages will be apparent to one of ordinary skill in the art in view of the drawings, specification, and claims hereof.

Figure 1A:
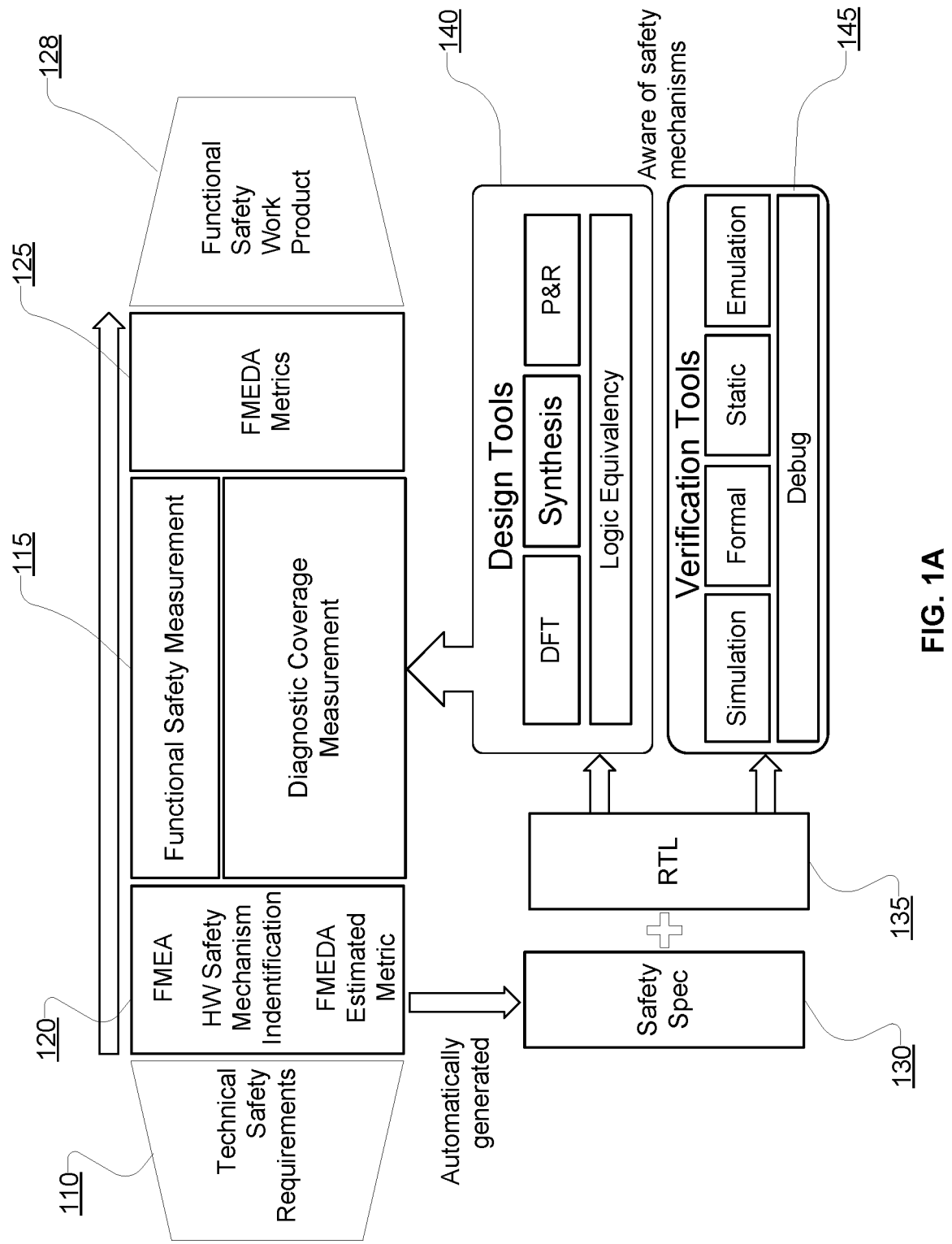
FIG. 1A illustrates the overall system environment for incorporating safety measures in a system design, according to an embodiment.

The figures use like reference numerals to identify like elements. A letter after a reference numeral, such as "310*a*," indicates that the text refers specifically to the element having that particular reference numeral. A reference numeral in the text without a following letter, such as "310," refers to any or all of the elements in the figures bearing that reference numeral (e.g. "310" in the text refers to reference numerals "310*a*" and/or "310*b*" in the figures).

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

DETAILED DESCRIPTION

A system analyzes safety requirements and ensures correct design and verification of safety measures satisfying the safety requirements in a system design. Various types of safety analyses are performed including failure mode effect analysis (FMEA), failure mode effect and diagnostic analyses (FMEDA), and so on. Additional user input may be received via a standard format (e.g., JSON or XML) that specifies additional details about intended safety measures. The system determines various failure modes of the design and associated safety measures (SMs), such as safety mechanisms based on the safety analysis.

The system generates a safety specification that includes commands implementing safety measures to meet the safety requirements determined based on the safety analysis. The safety specification is specified using a safety specification language which represents the safety intent of the design. The system allows users to modify the generated safety specification. For example, a user may modify the safety specification to add additional safety measures, remove some generated safety measures, or modify some safety measures.

The generated safety specification is processed by various tools throughout the design verification flow to ensure that the various tools conform to the safety specification. For example, for a circuit design, the safety specification is used by verification tools, synthesis tools, logical equivalency checking, place and route tools, RTL analysis, exploration and optimization tools, and for signoff verification before tape-out. The tools adjust the design of the system to incorporate various safety measures specified by the safety specification. A safety measure may be implemented in a component of the system design that is a software component, a hardware component, or a firmware component. Using a common safety specification throughout the design and verification process ensures every design or verification tool uses the same safety measures and satisfies the same safety requirements. As a result, there are no inconsistencies in the safety measures implemented by various tools using this safety specification.

A tool refers to a system or application that allows users such as circuit designers to perform a specific task using a computing system, for example, a design or verification task associated with a circuit design. A tool may include a user interface, for example, a graphical user interface that allows users to provide input to the tool as well as to display output to the user. The tool may use a command line interface. The tool may provide output such as results of execution via a file.

Other techniques may require a user to manually specify the safety measures for each step in the design and verification process. Such techniques may be cumbersome and error prone resulting in inconsistencies of safety measures used across the various design tools. The embodiments disclosed ensure consistency across various design tools using an automatically generated safety specification describing the safety measures and the intent of the users based on the safety analysis. The tools modify the system design to implement safety measures. The tools may generate metrics describing the system design that incorporate the safety measures. The generated metrics include safety metrics, for example, single point fault metric (SPFM), latent fault metric (LFM) and probabilistic metric for (random) hardware faults (PMHF) are computed to ensure the design is meeting safety goals. The metrics may include other aspects of the system design, for example, tools that estimate power, area, timing metrics, and so on modify the estimates of their corresponding metrics to accommodate the safety measure. A tool may either modify the system design and then determine a metric or adjust the metric values based on expected modifications of the system design according to the safety specification. For example, a tool may adjust estimates of power, area, timing, and other properties of the system design to account for possible changes to the system design to incorporate safety measures. Furthermore, the embodiments ensure that none of the safety measures are ignored in the various design tools.

FIG. 1A illustrates the overall system environment for incorporating safety measures in a system design, according to an embodiment. The blocks 110, 120, 115, 125, and 128 represent the safety analysis steps for a system being designed. The system receives technical safety requirements 110. Various types of safety analyses 120 is performed such as, FMEA, FMEDA, hardware safety measure identification, and so on. The system generates safety specification 130 based on the safety analysis performed. The system further receives a design of the system for processing by various design tools, for example, RTL (register transfer level) specification 135 of a circuit design. Various design tools use the safety specification 130 to enhance the system design with safety measures conforming to the safety specification 130, for example, design tools 140 such as design for testability (DFT) tools, synthesis tools, place and route tools, and verification tools 145 such as simulation tools, formal verification tools, emulators, static verification tools, and so on. The system provides diagnostic coverage and various safety metrics of the enhanced system to the system designers. The safety analysis flow includes steps 115 having functional safety measurement and diagnostic cover measurement 115 and fault simulation. The system design enhanced with safety measures provides additional metrics for example, SPFM and LFM metrics for further safety analysis. The functional safety work product 128 is provided as a result of the safety analysis of the enhanced system design.

Figure 1B:
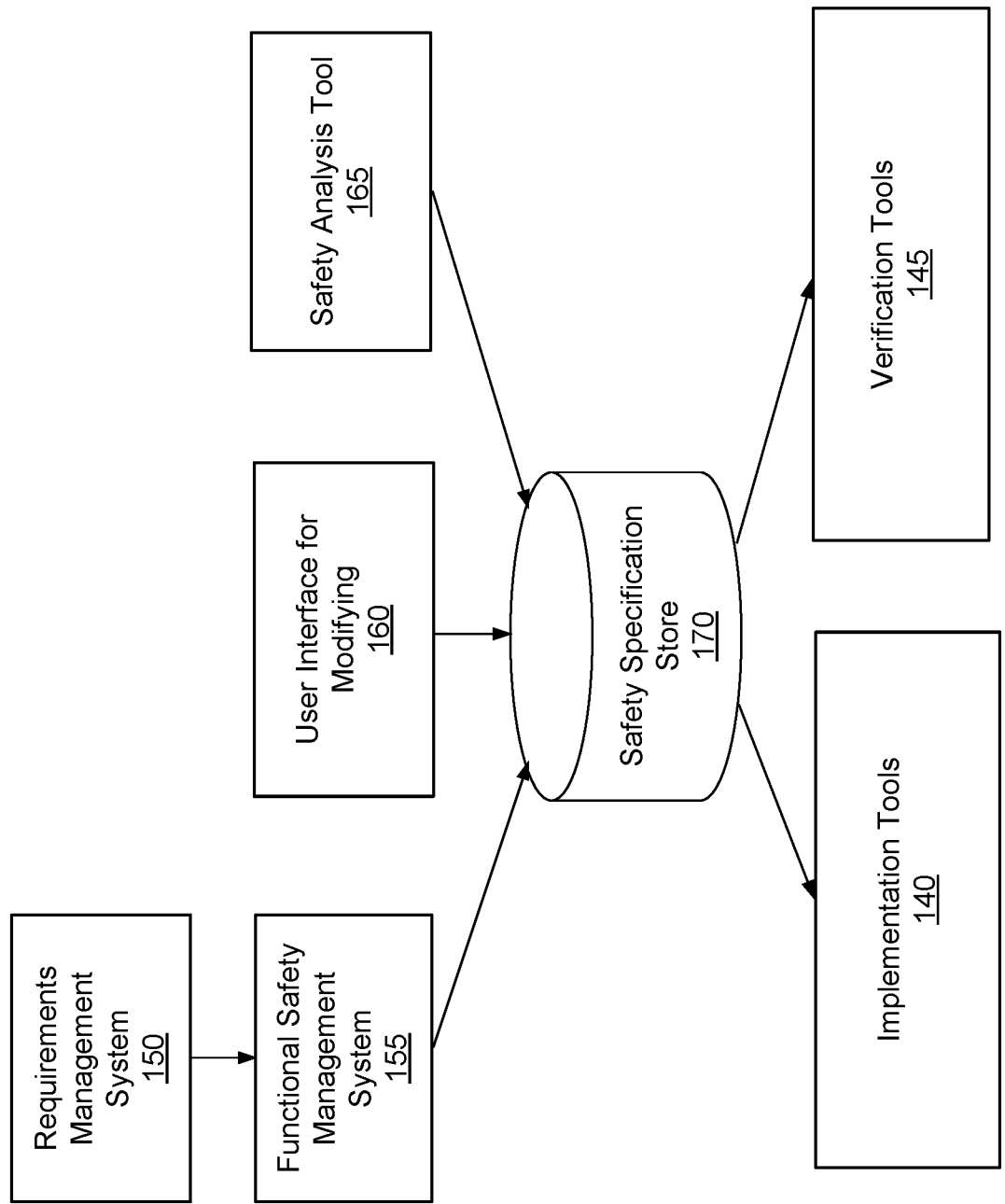
FIG. 1B illustrates the overall system environment for incorporating safety measures in a system design, according to another embodiment.

FIG. 1B illustrates the overall system environment for incorporating safety measures in a system design, according to another embodiment. A functional safety management system 155 receives safety requirements from a requirements management system 150. The functional safety management system 155 stores data structures representing the safety requirements. The functional safety management system 155 processes the data structures storing safety requirements to generate a safety specification that is stored in the safety specification store 170. The safety measure includes various commands that specify safety measures for the system design. The generated safety specification can be accessed by users via a user interface 160 that allows the users to modify the safety specification or enhance the safety specification by adding additional safety measures. The generated safety specification can be further analyzed using safety analysis tools 165.

The safety specification is processed by various tools including design tools 140 and verification tools 145. The design tools 140 and verification tools 145 generate or analyze a system design that implements various safety measures as specified using commands in the safety specification. The tools perform analysis of the system taking into account the safety measures. For example, the tools may perform an accurate power analysis of the system design by taking into consideration any modifications that may be made to introduce the safety measures that may affect the power consumption. As another example, if a safety measure introduces redundancy in a hardware component, thereby increasing the power consumption, the design tool 140 adjusts the power estimates accordingly. Similarly, if introducing a safety measure in a component increases the area of the system design, the design tools 140 adjust the estimates of the area of the system design. As another example, if introducing a safety measure in a component increases the delay along a path of the system design, the design tools 140 adjust the delay estimates of the paths of the system design to account for the safety measure. As a result, the design tools perform an accurate area, timing, power or other type of analysis of the system design that considers safety measures according to the safety specification. The verification tools perform fault simulation that takes into account the safety measures, thereby providing an accurate fault simulation. Since various tools use a common safety specification, the safety analysis as well as system design modifications to incorporate the safety measures are consistent and conform to the safety specification.

Techniques described herein may be applied to automotive design flow but are not limited to automotive design flow and can be applied to other design flows, for example, any EDA (electronic design automation) flow. The term 'safety' used herein refers to 'functional safety' unless indicated otherwise.

Figure 2:
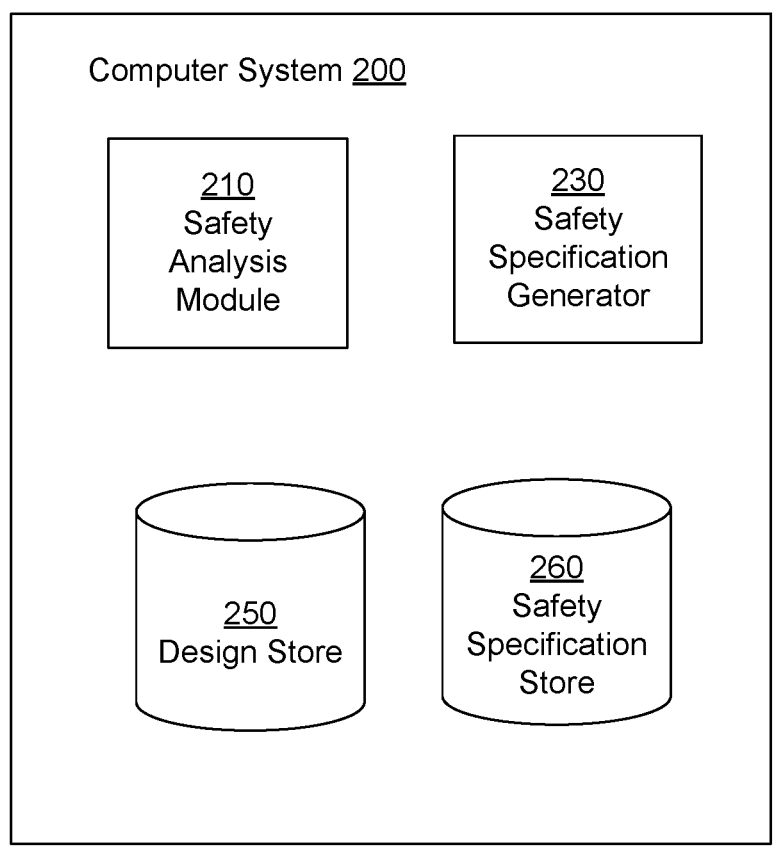
FIG. 2 illustrates the architecture of a system for incorporating safety measures in a system design, according to an embodiment.

FIG. 2 illustrates the architecture of a system for incorporating safety measures in a system design, according to an embodiment. The system architecture illustrated in FIG. 2 includes a computer system 200 comprising a safety analysis module 210, a safety specification generator 230, a design store 250, and a safety specification store 260. Other embodiments may include more or fewer modules than indicated in FIG. 2.

The design store 250 stores designs of systems, for example, circuit designs, software designs, firmware designs and so on. A system design may include components that may be software components, hardware components, or firmware components. The designs are processed by design tools. For example, a design representing a circuit design is processed by electronic design automation (EDA) tools, such as the tools shown in FIG. 8 and described in connection with FIG. 8.

The safety analysis module 210 presents a user interface to a user and receives details of safety requirement from the user via the user interface. The user interface allows users to perform various types of safety analysis including failure mode effect analysis (FMEA), failure mode effect and diagnostic analyses (FMEDA), and other possible safety analyses. For simplification of the description of the solution, the flow addresses FMEA/FMEDA analysis, however the disclosed techniques are applicable for other types of safety analyses such as DFA (dependent fault analysis), FTA (failure tree analysis), etc.

This analysis results in a list of failure modes (FM) and the associated safety measures (SM) for the design. The system incorporates the determined safety measures in the safety specification. The system may incorporate safety measures in the safety specification that are active safety measures or passive safety measures, monitors, isolation schemes, and so on. The safety specification may be generated based on other safety analyses including the dependent failure analysis (DFA), which identifies common cause failures (such as clock, reset, and power), or freedom from interference caused by different parts of the design. The analysis may be performed before design starts, and the user estimates coverage metrics. As the design process progresses, these analyses can be further refined, considering a more detailed design analysis.

The safety specification generator 230 receives various inputs describing the safety requirements and generates the safety specification for the design based on the safety requirements. The safety specification store 260 stores the generated safety specification of the designs. The user provides inputs in one place, via a user interface provided by the safety analysis module 210. The various design tools consistently verify and implement the design according to the safety intent described by the safety specification.

The design and verification tools modify the system design to incorporate safety measures in the design. Design tools include analysis, exploration, and optimization tools. The safety features added conform to the safety specification. Details of the processes for enhancing the system designs to add safety measures are further described herein.

As the design commences, failure mode effect and diagnostic analyses (FMEDA) for different parts of the design are performed by associating failure modes and their respective safety measures to specific design blocks and elements. Based on that information, various metrics such as single point fault metric (SPFM), latent fault metric (LFM) and probabilistic metric for (Random) hardware faults (PMHF) are computed to ensure the design is meeting safety goals. These metrics greatly depend on the diagnostic coverage of safety measures, which constitute most of the safety measures. Based on this analysis, FMEA and FMEDA reports are created for evidence of safety, along with DFA and (possibly) fault tree analysis (FTA) reports.

Figure 3:
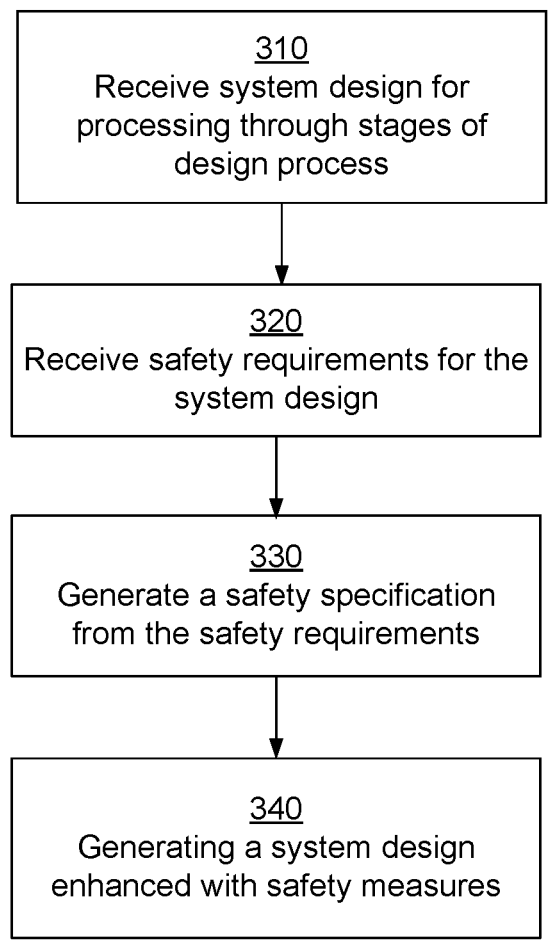
FIG. 3 shows a flowchart illustrating a process for enhancing a system design to incorporate safety measures, according to an embodiment.

FIG. 3 shows a flowchart illustrating a process for enhancing a system design to incorporate safety measures, according to an embodiment.

The system, for example, the computing system 200 receives 310 a system design for processing through various stages of design using a plurality of design tools. The system receives 320 safety requirements for the system design. The safety requirements specify safety measures for the system design. These safety measures represent an intent of the system designer identifying the safety measures that should be implemented by the various design tools.

The system generates 330 a safety specification from the safety requirements. The safety specification includes a set of commands from the received safety requirements. Each command specifies (a) a safety measure for one or more components of the system design and (b) one or more attributes processed by the design tools for analyzing, implementing and verifying the safety measure. The system may allow user to further modify the safety specification, for example, to add new commands, delete some automatically generated commands or to modify an existing command to adjust some parameters specified in the command.

The system receives a system design for processing by various design tools. The system generates 340 a system design enhanced with various safety measures for example, by modifying the system design to implement one or more safety measures as specified in the generated safety specification. One or more design tools process the generated safety specification to implement safety measures in the system design according to the received safety requirements. A design tool reads the safety specification and processes each command of the safety specification. The design tool identifies components in the system design that need to be modified to conform to the safety specification. A component that is modified to implement a safety measure may be a software component, a hardware component, or a firmware component.

If the safety specification includes commands that specify that components of a specific component type need to implement a specific safety measure, the design tool identifies all components of that component type and modifies their design to include the safety measure. As an example, if the safety specification specifies that certain types of registers should implement triple mode redundancy, the tool (1) identifies the registers R that need to be modified, (2) modifies the system design to include additional copies of the registers, (3) adds a majority voter component, (4) connects the input of the register R to inputs of each of the copies of the register, (5) connects the outputs of the copies of the registers to the input of the majority voter component, and (6) connects the output of the majority voter component to the component that received the output of the register R.

The same safety specification is used by multiple tools during the design process. For example, if a circuit design is being processed by multiple EDA tools, the same safety specification is used by verification tools, place and route tools, fault simulation tools, and so on. At tool may modify the design to incorporate a safety measure or performs an analysis that accounts for safety measures, for example, by scaling various parameters without having to explicitly modify the system design.

The system may specify a safety register to implement one of the following safety measures: (1) triple modular redundancy (TMR), (2) double modular redundancy (DMR) or (3) fault tolerance (FT). The safety measure specifies the number of copies of the register in the safety measure, for example, two copies of the register according to the DMR safety specification or three copies according to the TMR safety specification. The safety specification includes a command that creates a safety register. The command to create a safety register may take arguments including the type of safety measure (TMR, DMR, or FT), minimum distance between registers in the layout, pin types which need to be separately routed for replicated registers, and so on. The verification tools verify that the design tools adhered to the safety specification.

The command to create a safety register may not bind the safety measure to any specific registers or any other design elements but specify the intent behind the safety measure. Accordingly, the command specifies the parameters and constructs to implement the safety measure independent of the specific context in which the safety measure is being incorporated. This allows the safety measure to be incorporated during various stages of the design and verification process. A separate command is used to bind registers to the safety register rules described by the create safety register command. The various tools modify the system design to implement safety registers as illustrated in FIG. 4.

Figure 4:
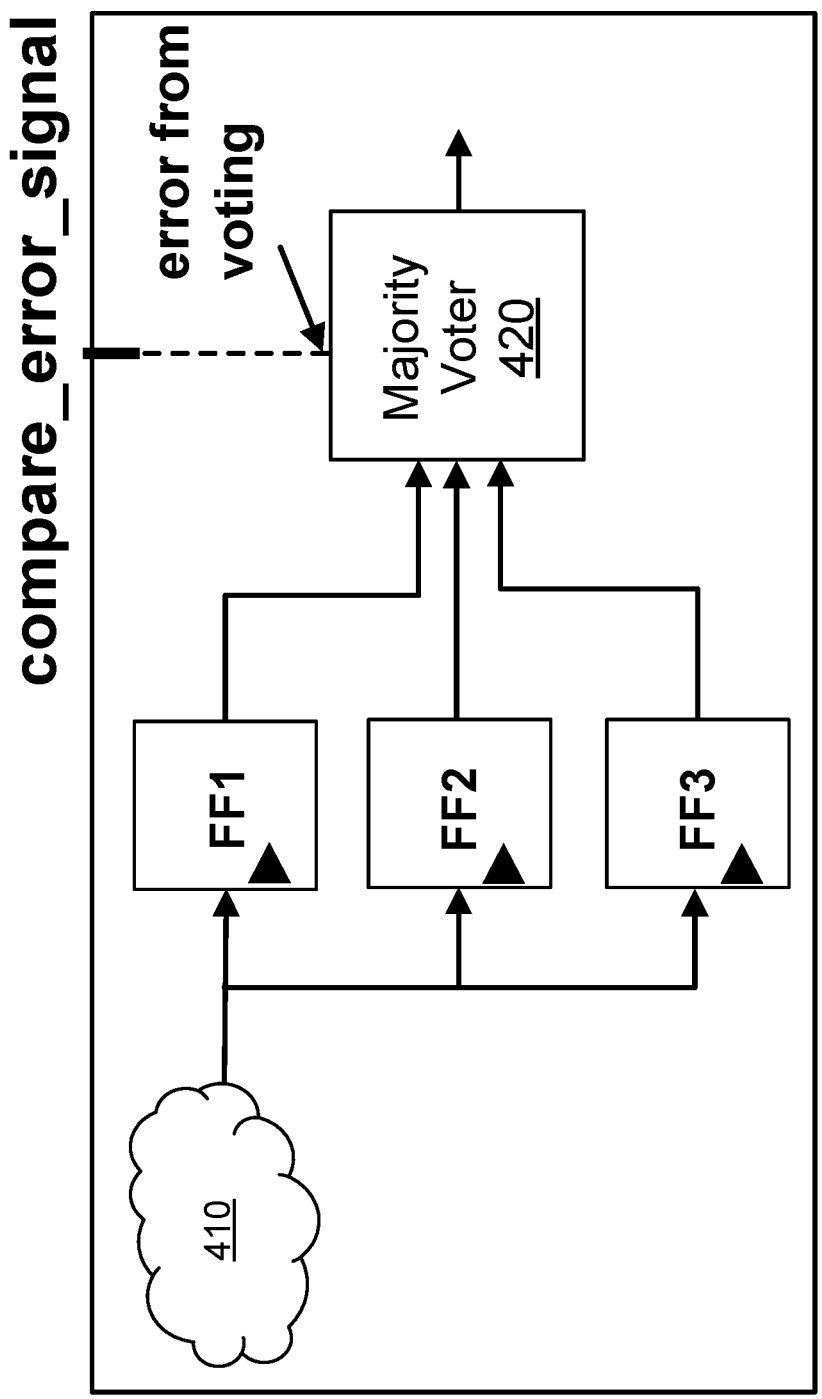
FIG. 4 shows an example of a design when safety registers are specified using safety specification, according to an embodiment.

FIG. 4 shows an example of a design when safety registers are specified using safety specification, according to an embodiment. As shown in FIG. 4, the safety specification specifies a triple modular redundancy. Accordingly, the tools enhance the circuit design to include three copies of the register, shown as flipflops FF1, FF2, and FF3. The inputs of the three flipflops FF1, FF2, and FF3 are received from components 410 of the circuit. The outputs of flipflops FF1, FF2, and FF3 are provided as input to a majority voter component that determines its output based on the majority of input values that are matching.

A tool may process the safety register command in the safety specification by modifying the system design to add additional registers and the majority voter in accordance with the command. A tool estimating the power of a circuit design may adjust the power requirements to account for additional power consumed by additional registers and the majority voter. A tool estimating the area of the circuit design may scale the area estimates to account for possible increase in areas as a result of adding the additional registers and the majority voter. A tool estimating a delay along various path lengths may adjust the delays by a scaling factor based on the delay added by the additional components introduced in the path for example, the majority voter.

In an embodiment, the safety specification includes a multi-core lock step command that specifies intent for safety critical modules which need to be replicated. This command ensures that at a particular step, the result generated by the step is compared by a redundant copy of this component. The command to create safety cores specifies the number of cores for a component. If the specification specifies two copies of the component be included, the safety measure is referred to as dual core lock step (DCLS) safety measure. In general, the safety specification may specify a multi-core lock step (MCLS) safety measure.

If two cores are specified, the tools modify the design to include two copies of the component and add\s comparison logic at each output of the component. If three cores are specified, the tools modify the design to include three copies of the component and adds voting logic at each output. If the command specifies a higher replication factor than three, the user must provide an HDL (hardware description language) module name which is used to select the winning value, if all cores do not agree on a single value for an output. The various tools modify the system design to implement multiple cores as illustrated in FIG. 5.

Figure 5:
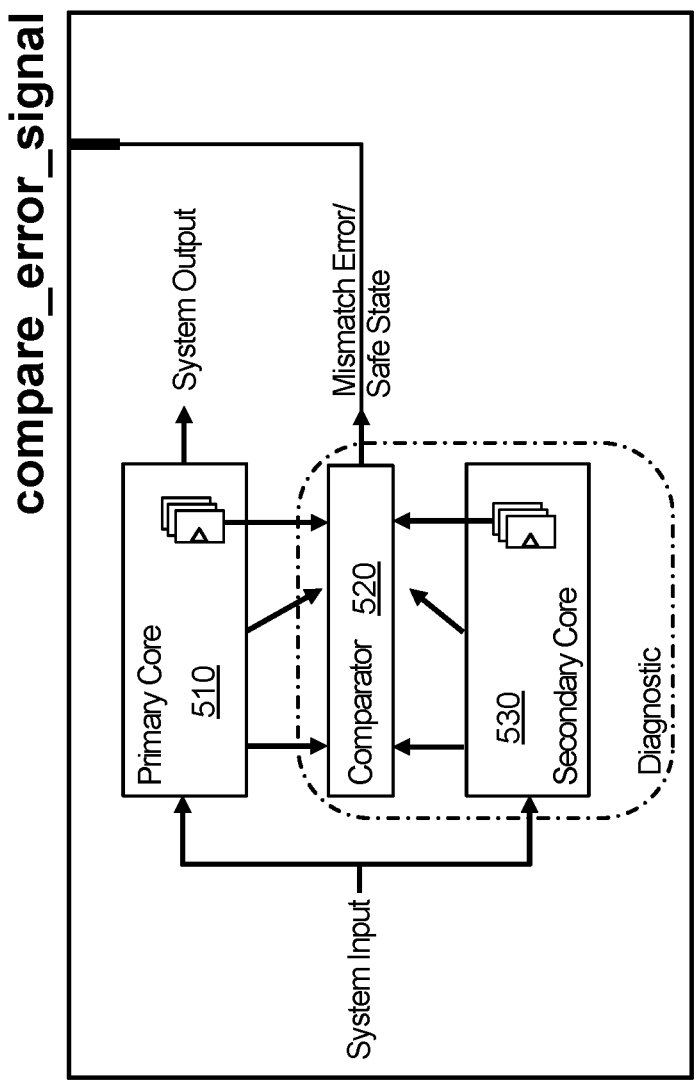
FIG. 5 shows an example of system design when a safety core rule is specified by the safety specification, according to an embodiment.

FIG. 5 shows an example of system design when a safety core rule is specified by the safety specification, according to an embodiment. As shown in FIG. 5, a create safety core command is used to specify the safety intent using two cores. The tools modify the design to use two cores including a primary core 510 and a secondary core 530 and uses a comparator 520 to compare outputs of the two cores 510 and 530.

A tool may process the multi-core lock step command in the safety specification by modifying the system design to add the multi-core login in accordance with the command. A tool estimating the power of a circuit design may adjust the power requirements to account for additional power consumed by the secondary core and the comparator. A tool estimating the area of the circuit design may scale the area estimates to account for possible increase in areas as a result of adding the secondary core and the comparator.

In an embodiment, the safety specification includes a command that specifies intent for failsafe finite state machine (FSM). This command specifies the FSM in the design which needs to be designed against deadlock due to single event upset (SEU). If any SEU puts an FSM into corrupted state, the design includes a mechanism encoded in the FSM for it to recover to a recovery state, thereby preventing the system from going in a hung state.

Figure 6:
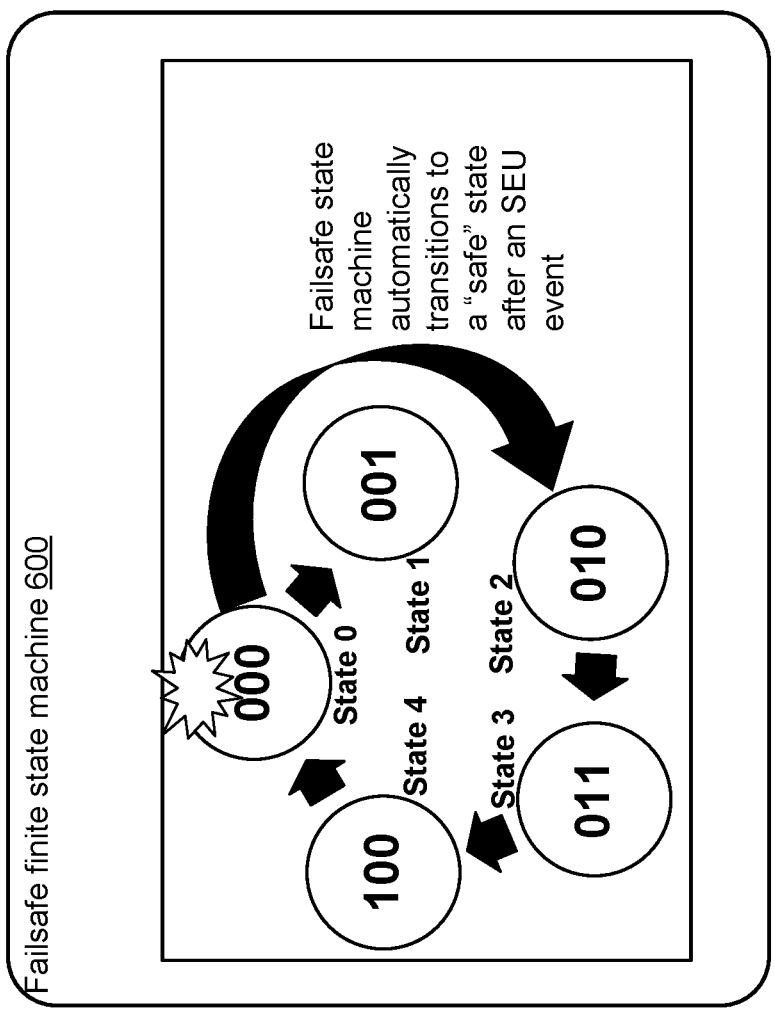
FIG. 6 shows an example of design using a failsafe finite state machine, according to an embodiment.

FIG. 6 shows an example of design using failsafe finite state machine, according to an embodiment. A finite state machine 600 illustrated in FIG. 6 transitions through various states including states 000, 001, 010, 011, and 100. State 010 is identified as a safe state. If a failure occurs in state 000, the system transitions to safe state 010 and skips state 001.

Verification tools ensure these FSMs are implemented to adhere to the safety specification. Design tools modify system design to add transition from illegal states to legal states. In an embodiment, the tools automatically insert error detection and error correction circuit using hamming codes hamming2 and hamming3 respectively. For example, error detection/correction circuits may be inserted into a netlist representing a circuit design by the synthesis tool.

Tools such as RTL verification tools, simulator/emulator tools model the error detection/correction functionality. This allows a user to inject fault in the FSM register to create the scenario of error detection causing the FSM to reset to the default state. This verifies the down-stream logic from this FSM to be able to handle correctly the scenario of this FSM resetting in the middle of operation due to SEU. RTL level fault simulation also takes this modified functionality into account. RTL level fault simulation need to know that fault on a single flip flop of the FSM is detected & corrected. User can perform RTL simulation/emulation by injecting error using force/deposit, and making sure that the error does not propagate downstream. The modified system design corrects the error.

In an embodiment, the safety specification includes commands that add design monitors to the system design. A monitor is a component that receives a signal from a specific point in the system design and may perform actions based on the signal, for example, to monitor certain activity and report or generate another signal. For example, the monitor may detect whether the signal exceeds a threshold value and generate an interrupt if the signal exceeds a threshold value. The monitor command specifies the inputs and outputs of the monitor and parameters, for example, threshold values that the monitor uses to compare a signal. Another example of a monitor is a temperature monitor which detects whether the temperature is above or below allowed operating conditions.

Figure 7:
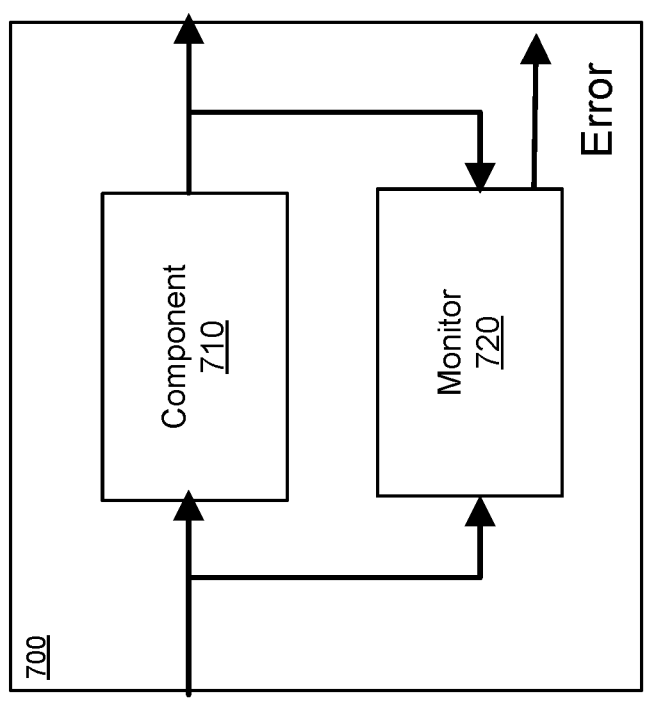
FIG. 7 shows an example of a system design enhanced with a design monitor, according to an embodiment.

FIG. 7 shows an example of a system design 700 enhanced with a design monitor, according to an embodiment. The system receives a system design 700 and enhances it with a monitor. The monitor 720 receives the input signal and output signal of the component 710. Based on values of the input signal and output signal, the monitor 720 generates an error value. Accordingly, the monitor may implement a constraint check based on the inputs and outputs of a component 710.

A tool may process the monitor command in the safety specification by modifying the system design to add the monitor logic in connection with components identified by the safety specification. A tool estimating the power consumption of a circuit design may adjust the power consumption estimates to account for additional power consumed by the monitor. A tool estimating the area of the circuit design may scale the area estimates to account for possible increase in areas as a result of adding the monitor.

The above examples of commands of the safety language used in a safety specification are provided for illustration purposes. Various other types of safety measures can be implemented using the techniques disclosed herein, such as error correction code (ECC), error detection code (EDC), parity check, and cyclic redundancy check. Furthermore, the safety specification may be represented using any format or representation and is not limited to any specific syntax, format, or language. Various tools are described herein for illustration purposes. However, the techniques may be implemented using other tools not mentioned herein. Furthermore, the safety measures specified in a safety specification may be implemented in a system design using hardware, software, or firmware.

Figure 8:
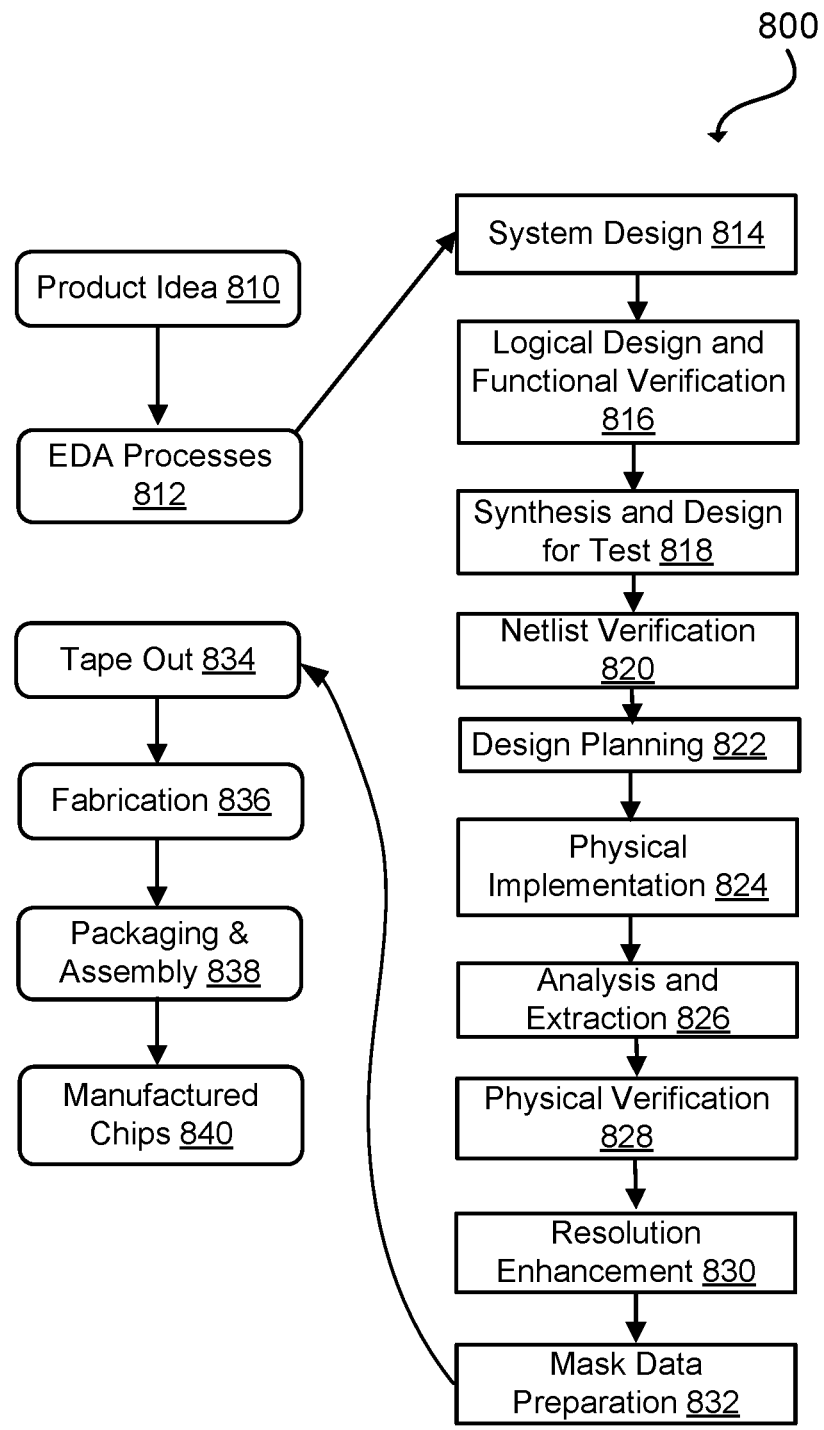
FIG. 8 depicts a flowchart of various processes used during the design and manufacture of an integrated circuit in accordance with some embodiments of the present disclosure.

FIG. 8 depicts a flowchart of various processes used during the design and manufacture of an integrated circuit in accordance with some embodiments of the present disclosure. FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower level that is a more concrete description adds more useful detail into the design description, for example, more details for the modules that include the description. The lower levels of representation that are more concrete descriptions can be generated by a computer, derived from a design library, or created by another design automation process. An example of a specification language at a lower level of representation language for specifying more detailed descriptions is SPICE (Simulation Program with Integrated Circuit Emphasis), which is used for detailed descriptions of circuits with many analog components. Descriptions at each level of representation are enabled for use by the corresponding tools of that layer (e.g., a formal verification tool). A design process may use a sequence depicted in FIG. 8. The processes described by be enabled by EDA products (or tools).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Figure 9:
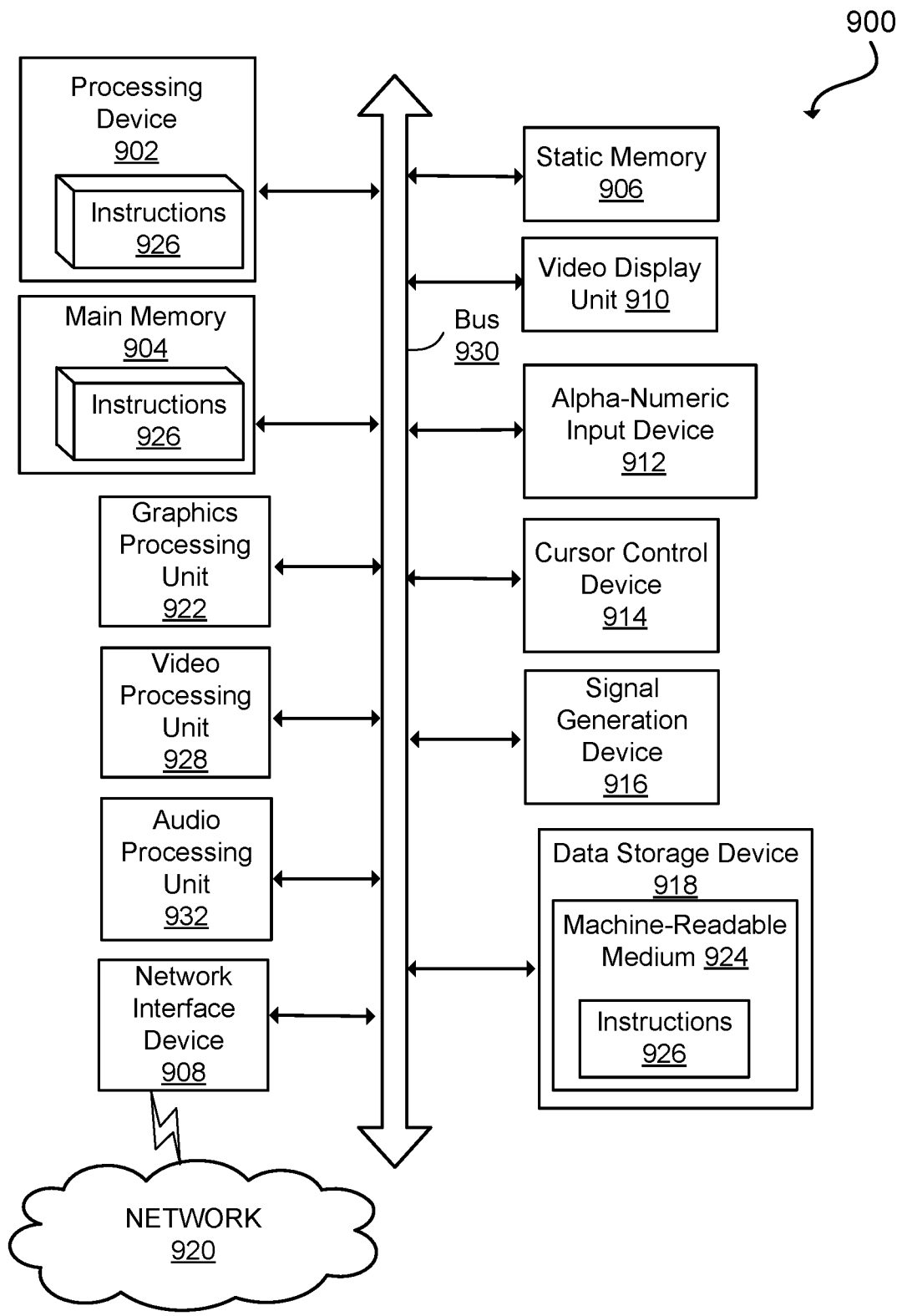
FIG. 9 depicts a diagram of an example computer system in which embodiments of the present disclosure may operate.

FIG. 9 depicts a diagram of an example computer system in which embodiments of the present disclosure may operate. FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

ALTERNATIVE EMBODIMENTS

The embodiments disclosed herein can be used to connectivity verification of circuits in view of low power considerations. Although SOC I/O ring connectivity is presented as an example of a type of circuit for which the formal verification is performed, embodiments can be used for formal verification of any other type of circuit. Furthermore, the assertions used for formal verification are not limited to assertions specifying connectivity of the circuit but can be any other kind of assertions describing the circuit.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise. Upon reading this disclosure, those of skill in the art will appreciate still additional alternative structural and functional designs for a system and a process for formal verification of circuit in view of low power considerations. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method executing instructions for enhancing a system design to incorporate safety measures, the method comprising:
   receiving the system design for processing through various stages of design and verification using a plurality of tools;
   receiving safety requirements for the system design, the safety requirements specifying safety measures for the system design;
   generating from the received safety requirements, a safety specification, the safety specification including one or more safety measures;
   performing analysis of the system design, the analysis determining a metric based on one or more of: a power requirement, an area, or a delay of the system design;
   scaling the metric to account for an expected modification to the system design for implementing a safety measure, the scaling determining an impact of incorporating the safety measure in the system design without modifying the system design; and
   creating one or more safety reports for the system design based on the metric.

2. The computer-implemented method of claim 1, wherein the safety specification includes a set of commands, each command specifying:
   (a) a particular safety measure for one or more components of the system design and
   (b) one or more attributes processed by one or more tools for implementing the particular safety measure.

3. The computer-implemented method of claim 1, wherein a safety measure is implemented in a component of the system design, wherein the component is one of:
   a software component,
   a hardware component, or
   a firmware component.

4. The computer-implemented method of claim 1, wherein the system design represents a circuit design and the plurality of tools represent electronic design automation (EDA) tools, further comprising:
   modifying the system design to implement one or more safety measures for a tool of the plurality of tools.

5. The computer-implemented method of claim 4, wherein the modifying comprises, for each tool in at least a subset of the plurality of tools:
   processing by the tool, the generated safety specification to implement one or more safety measures.

6. The computer-implemented method of claim 4, wherein the tool is a synthesis tool, wherein processing the generated safety specification by the synthesis tool comprises:
   selecting a command of the generated safety specification, the command specifying a safety measure; and
   modifying a representation of the circuit design processed by the synthesis tool to implement the safety measure specified by the command.

7. The computer-implemented method of claim 4, wherein the tool is a place and route tool, wherein processing the generated safety specification by the place and route tool comprises:
   selecting a command of the generated safety specification, the command specifying a safety measure; and
   ensuring by the place and route tool, physical separation between components in accordance with the selected command of the generated safety specification.

8. The computer-implemented method of claim 1, wherein a safety measure comprises one or more of:
   safety register with one of: triple mode redundancy, double mode redundancy, or fault tolerance;
   dual core lock step,
   failsafe finite state machine,
   monitor,
   error correction code (ECC),
   error detection code (EDC),
   parity check, or
   cyclic redundancy check.

9. The computer-implemented method of claim 1, wherein a tool of the plurality of tools is a formal verification tool, the method further comprising:
   verifying by the formal verification tool, that the safety measures implemented in the system design conform to the received safety requirements.

10. The computer-implemented method of claim 1, wherein a tool of the plurality of tools is a fault simulator, the method further comprising:

performing by the fault simulator, diagnostic coverage of the system design enhanced with safety measures, the diagnostic coverage conforming to the generated safety specification.

11. The computer-implemented method of claim 1, wherein a tool of the plurality of tools is a power estimation tool, the method further comprising:
estimating, by the power estimation tool, power consumption of the system design enhanced with safety measures.

12. The computer-implemented method of claim 1, further comprising:
responsive to receiving a safety signoff for the system design enhanced with the safety measures, providing a representation of the system design enhanced with the safety measures for manufacture of the system.

13. A non-transitory computer-readable storage medium storing executable computer program instructions, the instructions executable by a computer processor and causing the computer processor to perform steps comprising:
receiving a system design for processing through various stages of design and verification using a plurality of tools;
receiving safety requirements for the system design, the safety requirements specifying safety measures for the system design;
generating from the received safety requirements, a safety specification, the safety specification including one or more safety measures;
performing analysis of the system design, the analysis determining a metric based on one or more of: a power requirement, an area, or a delay of the system design;
scaling the metric to account for an expected modification to the system design for implementing a safety measure, the scaling determining an impact of incorporating the safety measure in the system design without modifying the system design; and
creating one or more safety reports for the system design based on the metric.

14. The non-transitory computer-readable storage medium of claim 13, wherein a safety measure is implemented in a component of the system design, wherein the component is one of:
a software component,
a hardware component, or
a firmware component.

15. The non-transitory computer-readable storage medium of claim 13, wherein the system design represents a circuit design and the plurality of tools represent electronic design automation (EDA) tools.

16. The non-transitory computer-readable storage medium of claim 15, wherein a tool of the plurality of tools is a synthesis tool, wherein instructions for processing the generated safety specification by the synthesis tool cause the computer processor to perform steps comprising:
selecting a command of the generated safety specification, the command specifying a safety measure; and
modifying a representation of the circuit design processed by the synthesis tool to implement the safety measure specified by the command.

17. The non-transitory computer-readable storage medium of claim 15, wherein a tool of the plurality of tools is a place and route tool, wherein instructions for processing the generated safety specification by the place and route tool cause the computer processor to perform steps comprising:
selecting a command of the generated safety specification, the command specifying a safety measure; and
ensuring by the place and route tool, physical separation between components in accordance with the selected command of the generated safety specification.

18. The non-transitory computer-readable storage medium of claim 13, wherein a safety measure comprises one or more of:
safety register with one of: triple mode redundancy, double mode redundancy, or fault tolerance;
dual core lock step,
failsafe finite state machine,
monitor,
error correction code (ECC),
error detection code (EDC),
parity check, or
cyclic redundancy check.

19. The non-transitory computer-readable storage medium of claim 13, wherein a tool of the plurality of tools is a formal verification tool, wherein the instructions further cause the computer processor to perform steps comprising:
verifying by the formal verification tool, that the safety measures implemented in the system design conform to the received safety requirements.

20. A computer system comprising:
a computer processor; and
a non-transitory computer-readable storage medium storing executable computer program instructions, the instructions executable by the computer processor and causing the computer processor to perform steps comprising:
receiving a system design for processing through various stages of design and verification using a plurality of tools;
receiving safety requirements for the system design, the safety requirements specifying safety measures for the system design;
generating from the received safety requirements, a safety specification, the safety specification including one or more safety measures;
performing analysis of the system design, the analysis determining a metric based on one or more of: a power requirement, an area, or a delay of the system design;
scaling the metric to account for an expected modification to the system design for implementing a safety measure, the scaling determining an impact of incorporating the safety measure in the system design without modifying the system design; and
creating one or more safety reports for the system design based on the metric.

\* \* \* \* \*